United States Patent [19]

Bierwas

[11] 3,946,865
[45] Mar. 30, 1976

[54] CASSETTE CONTAINER

[76] Inventor: Reinhard Bierwas, Marktstrasse 42, Huttental-Geisweid, Germany

[22] Filed: Jan. 24, 1975

[21] Appl. No.: 543,684

[30] Foreign Application Priority Data
Jan. 25, 1974   Germany..................... 7402445[U]

[52] U.S. Cl. ............... 206/387; 206/805; 220/23.4; 220/23.6; 220/334; 221/87; 312/15; 312/111
[51] Int. Cl.² ........................................ B65D 85/672
[58] Field of Search ........ 312/111, 15, 246; 221/87; 206/387, 1.5, 805, 459, 467, 249, 251, 252, 250; 220/69, 23.4, 23.6, 334, 262, 17

[56] References Cited
UNITED STATES PATENTS

| 2,088,171 | 7/1937 | Kaufman | 206/805 |
| 2,257,001 | 9/1941 | Davis | 312/111 |
| 2,583,822 | 1/1952 | Duncan | 220/23.4 |
| 2,969,890 | 1/1961 | Udell | 220/69 |
| 3,163,480 | 12/1964 | Hoenle | 220/23.4 |
| 3,563,624 | 2/1971 | Stice | 312/111 |
| 3,642,337 | 2/1972 | Manheim | 206/387 |
| 3,677,396 | 7/1972 | Staar | 206/387 |
| 3,811,745 | 5/1974 | Cylke | 221/87 |

FOREIGN PATENTS OR APPLICATIONS

| 592,950 | 5/1959 | Italy | 206/805 |
| 704,181 | 4/1966 | Italy | 206/805 |

Primary Examiner—William Price
Assistant Examiner—Allan N. Shoap
Attorney, Agent, or Firm—Norman S. Blodgett; Gerry A. Blodgett

[57] ABSTRACT

Container suitable for accommodating a tape cassette.

23 Claims, 10 Drawing Figures

U.S. Patent  March 30, 1976  Sheet 1 of 2  3,946,865
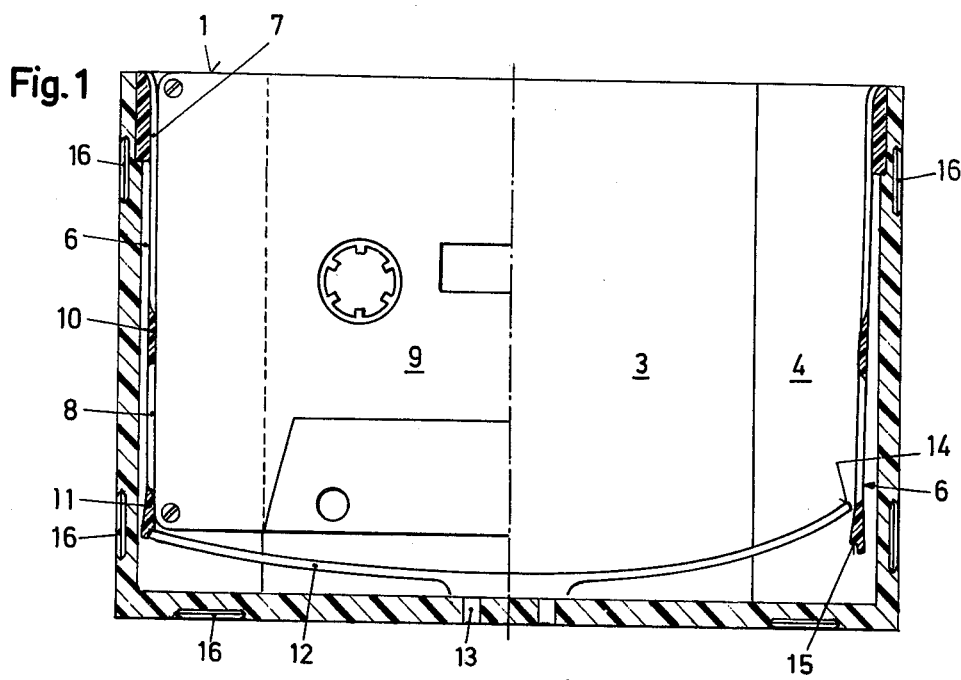
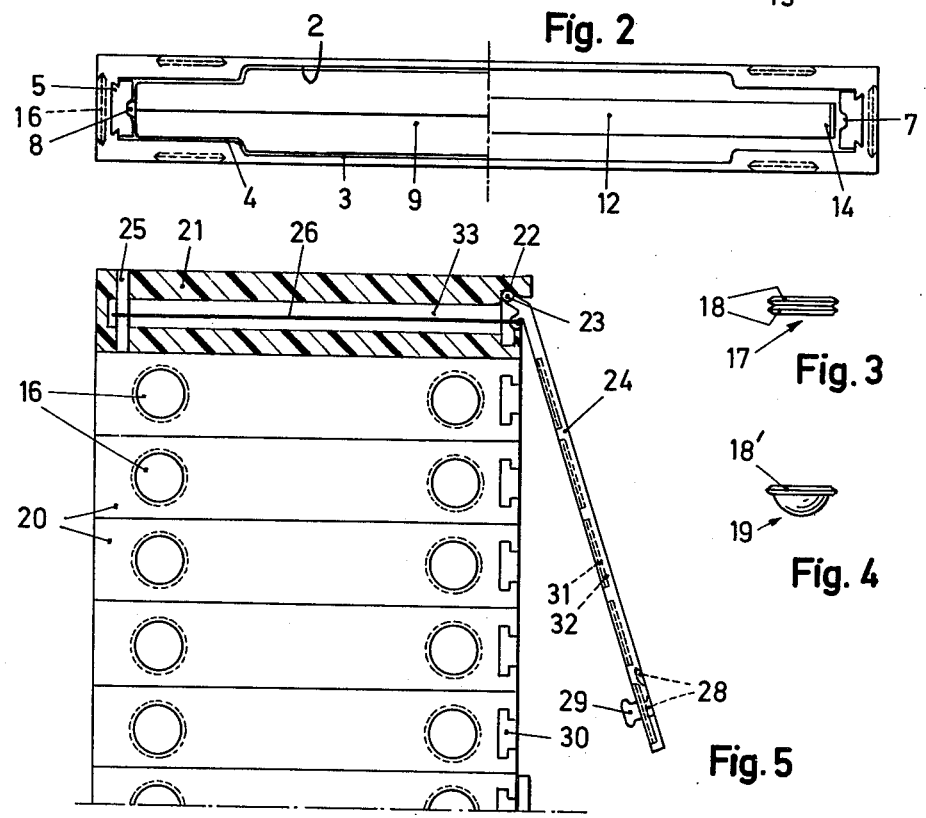

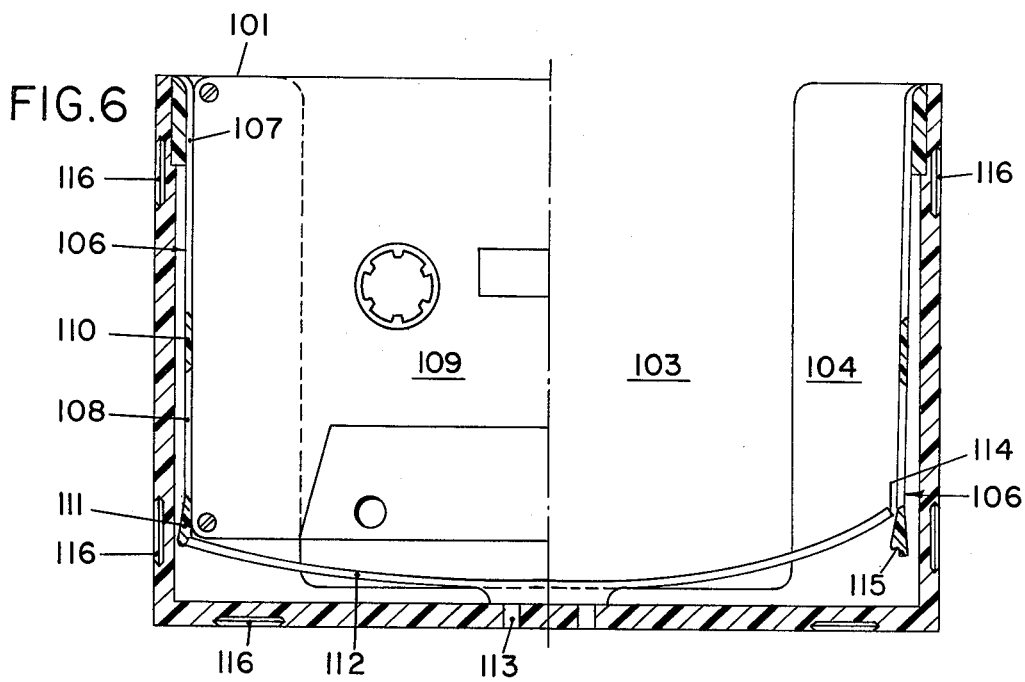
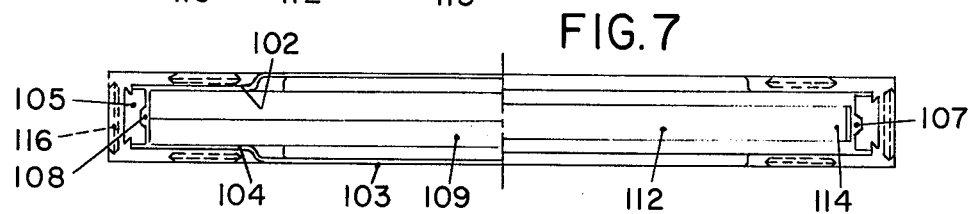
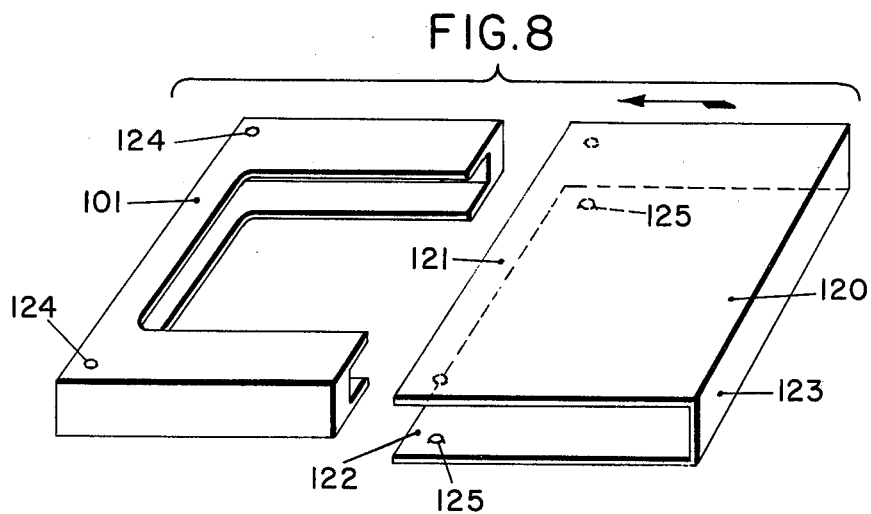
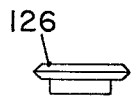
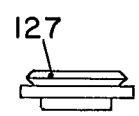

CASSETTE CONTAINER

BACKGROUND OF THE INVENTION

Recording tapes of 6.25mm width and of average thickness are used in the form of open spools and are usually stored in cases or boxes made of plastic or cardboard. Narrow and extra-thin magnetic sound tapes are normally supplied in cassettes designed to prevent dust from finding its way onto the sensitive tape and also to protect the tape from mechanical damage. Since the thin (and very fragile magnetic tape) is exposed at the mouth of the cassette, a plastic box is usually supplied, which contains one or more cassettes and from which the latter are removed as and when required. Difficulties are encountered, however, in the storage or stacking of the widely-used so-called "compact" cassettes; the plastic box which protects them has, when closed, a parallelpipedal shape with smooth outer surfaces, so that, owing to the light weight of the cassette and its box and the resulting danger of slipping, it is not practicable to stack more than a very small number of boxes on top of one another.

Various aids have therefore already been devised for the methodical storage of small and large numbers of boxes containing compact cassettes. One simple device consists of a stand having a flat base surface which accommodates the narrow longitudinal sides of the boxes and causes them to stand upright by means of narrow side panels and partitions, while the rear wall of the stand consists of a continuous strip. If the stand is inclined, it is possible to slide a number of cassettes and their boxes into the angle formed by the base surface and the rear strip, so that the cassettes occupy exactly similar positions. A device designed to accommodate six boxes can be extended as desired, by connecting similar devices together in side-by-side relation in accordance with the form-locking principle. In this system the boxes themselves are exposed and subject to dust, as are the stands, and, if the boxes are numerous, the number of stands which are required form an excessively long row.

Another known device for accommodating a larger number of cassettes (each in its own box) comprises four compartments, each open at the front and mounted in a square on a turntable in such a way that six cassettes in their boxes can be inserted into each of the compartments through its open front. While it is true that the capacity of this system can be increased by mounting a number of such devices one above the other, the rotatable arrangement is inhibited by the fixed order in which the sets or collections of cassettes are arranged. The cost and amount of apparatus involved in a system of this kind are by no means negligible and, although the cassettes in their boxes are protected, the apparatus as a whole is exposed to dust. A common feature of the known devices for accommodating a number of compact cassettes is that they are more or less open and thus exposed to the ingress of foreign matter. The compact cassettes themselves, however, are protected inside their separate boxes, standing in the said devices. These and other difficulties experienced with the prior art devices have been obviated in a novel manner by the present invention.

It is, therefore, an outstanding object of the present invention to provide a plastic box to accommodate a cassette of recording tape such as that widely used at the present time, (the so-called "D" cassette).

Another object of this invention is the provision of a plastic box of the said type which can be used to form a device for accommodating a number of compact cassettes and which enables each compact cassette itself to be gripped by the user with a simple manipulation and removal from the box in readiness for playing, thus providing, practically without the need for any essential additional components, an ideal means of storing and accommodating compact cassettes.

With these and other ojbects in view, as will be apparent to those skilled in the art, the invention resides in the combinations of parts set forth in the specification and covered by the claims appended hereto.

SUMMARY OF THE INVENTION

In general, the present invention consists of a container formed of plastic material suitable for holding a compact cassette of recording tape and formed as a shallow box of rectangular form having an opening in one of its longer sides through which the cassette is introduceable into the box. Each of the two shorter sides of the box has a leaf spring associated with the internal wall thereof, the springs being resiliently secured to the wall adjacent the open side of the box. Each spring has a pair of detent surfaces formed thereon in spaced apart relation, so that, when a cassette is inserted completely into the box, the detent surfaces of each spring engage opposite ends of a guide bar on the adjacent edge of the cassette to retain the cassette in the box. A pressure spring engageable by the cassette is provided on the internal surface of the longer side of the box which faces said opening.

More specifically, it has been found useful to provide the leaf springs with guide grooves or perforations which extend around the flanks of the guide bars on the conventional compact cassettes. It has also been found useful to allow the detent surfaces to extend beyond the surfaces of the leaf springs and to connect them at the rear with abutting surfaces.

A simple construction for the pressure spring is in the form of a symmetrical leaf spring whose length exceeds the width of the compact cassette (at least in the zone in which the free ends are supported) and which affixed to the center of its base. The distance between the ends of the symmetrical leaf springs, when the compact cassette is inserted and fixed, is preferably made somewhat greater than its length and the free ends of the symmmetrical leaf springs are provided with bearing surfaces for the supporting surfaces of the leaf spring. It has been found useful to design the bearing surfaces to extend into supporting surfaces and be held thereby.

The connection between the individual plastic boxes is facilitated if their outer surfaces are provided with undercut recesses and with projections corresponding in shape to the recesses. On the other hand, the outer surfaces of the plastic box can be provided with undercut recesses serving to accommodate connecting pieces; such connecting pieces of elastic plastic, corresponding in shape to the combination of two recesses of the plastic box, placed one upon the other, have been found advantageous. In a similar manner, feet formed of elastic plastic can be made, the shape of their upper part corresponding to one of the recesses of plastic box. The height of the plastic box can be reduced almost to that of the compact cassettes, so that it takes the form of a U-shaped bracket having open surfaces on both sides. Satisfactory results have been obtained with a covering that covering that consists of a plate, made of transparent plastic, the length corresponding to that of the box and the width being several times that of the box. The plate is provided with hinge elements on one longitudinal side and with a handle in the vicinity of the opposite longitudinal side. The hinge elements may take the form of levers which extend backwardly from the plane of the parallelepipedal structure and grips a box in the manner of a fork and engages it by means of pins and borings. The longitudinal side which is situated opposite the hinge elements can be provided with locking pins extending toward the rear; the box has appertures which widen inwardly and serve to accommodate the said locking pins. The hinge elements, however, can engage as well as separate parallelepipedal body whose base surface corresponds to that of the box and which is provided with recesses to accommodate connecting pieces or feet. Constant pressure of the covering surfaces can be obtained if the parallelepipedal body has a recess for a loop of rubber thread stretched between bolts or hooks provided at the bottom of the said recess and hooks provided on the rear side of the covering surface. The apparatus is rendered easier to view if at least one of the base surfaces of the hinged parallelepipedal body is provided with projections or recesses to accommodate labels.

BRIEF DESCRIPTION OF THE DRAWINGS

The character of the invention, however, may be best understood by reference to one of its structural forms, as illustrated by the accompanying drawings, in which:

FIG. 1 is a horizontal sectional view through a plastic container constructed in accordance with the invention, the outline of an inserted compact cassette being shown in one half of the section, FIG. 2 is an end view of the container, FIG. 3 is a side view of a connecting piece, FIG. 4 is a side view of a foot, FIG. 5 is a side view, partly in section, of a number of plastic containers connected together and positioned one above the other, with a cover member and with a holding device by which the cover member is supported and prestressed, FIG. 6 is a horizontal sectional view of a modification of the invention, with a cassette shown in place in the left half only, FIG. 7 is front elevational view of the container, FIG. 8 shows in perspective the container and a protective covering, FIG. 9 is an elevational view of a modified form of the foot, and FIG. 10 is an elevational view of a still further modification of the foot.

DESCRIPTION OF THE PREFERREDD EMBODIMENT

FIGS. 1 and 2 show parallelepipedal container 1 formed of plastic material with an opening 2 at one end through which a compact cassette can be inserted into the box. The opening leads to a cavity in the box and the depth of the opening and cavity in a central zone 3 is such as to accommodate the thickest part of the compact cassette. Two edge zones 4 of the cavity and opening are of smaller depth to accommodate the reduced thickness of the sides of the cassette. The mouth of the cassette, that is, the end of the cassette at which the recording tape is exposed, is introduced first into the box.

A pair of leaf springs 6 are connected one to each of the internal surfaces of the short narrow sides of the plastic box by means of dovetail keys 5 engaging dovetail grooves, each of said springs being subdivided along most of its length by means of a guide groove 7 for the reception of a guide bar 8 which is formed on each of the opposite edges of a compact cassette 9. The grooves are bridged by projections 10 and 11 of which the flanks facing toward one another are at the two ends of a guide bar on a cassette inserted into the box.

To the end wall of the box which faces towards the opening 2 there is connected a pressure spring 12 in the form of a symmetrical leaf spring of plastic material. The central portion of the spring is connected to the wall of the plastic box by means of pins 13 inserted and held by an adhesive in holes in the end wall. The leaf springs 6 and the pressure spring 12 are so constructed that their free ends extend towards the center of the plastic box. Upon introducing the compact cassette 9 into the box, it is guided by means of its guide bars 8 sliding in the guide grooves 7 of the leaf springs 6; the said leaf springs are pressed apart. As the insertion continues, the end surface of the compact cassette 9 engages the free ends of the pressure spring 12 and bends them rearwardly backwards. The free ends of the pressure spring 12, slide over the leaf springs 6 and their projections 11, thus spreading the free ends still farther apart. Just before the cassette has been inserted as far as it will go, the free ends of the pressure spring 12 pass over the ends of the leaf springs 6 and these are able (due to the inherent elasticity of the springs) to pivot back again the distance required to enable them to come to rest on the flanks of the compact cassette.

If the cassette is now released relatively slowly, it is pushed forwardly by the action of the pressure spring 12. After it has covered a short distance, however, bearing surfaces 14 at the ends of the pressure spring 12, are intercepted by supporting surfaces 15 at the free ends of the pressure springs 6. The dimensions are selected to ensure in this position the projections 10 and 11 of the pressure springs 6 will abut the cassette on opposite sides of the guide bars 8 and secure the cassette in position.

To remove the cassette completely from the box, the cassette is once again pressed inwardly for a short distance and then released. When pressed in, the front ends of the guide bars 8 move up on the internal flanks of the projections 11 and spread the leaf springs apart, thus releasing the ends of the springs 6 from the spring 12 and forcing back the pressure spring at the same time. When the cassette is released, the stronger pressure spring 12 is able to accelerate the cassette. Its free ends pass through the zone of the supporting surfaces 15 of the leaf spring 6 before these springs (which are weaker and which are subjected to the mass of the projections 10 and 11) are able to move back and engage with their supporting surfaces the bottom of the bearing surfaces of the pressure spring 12. This process is assisted by the fact that the acceleration of the cassette from its innermost position takes place under the action of the pressure spring 12, while the projection 11 is at first still moving on the cassette or its guide bar and is also still stationary. Therefore, under the effect of the pressure spring 12, the cassette has already been accelerated to a substantial ejection speed before the leaf springs 6 are allowed to move back. During this process, the rear ends of the guide bars 8 encounter the upper flat zone of the inner flanks of the projections 100, thus spreading the leaf springs 6 apart once again. Thus, the pressure spring is able to expand completely and eject the cassette from the box a distance which is sufficient to enable the cassette to be conveniently gripped by the user. As the cassette now no longer has any special covering, it is ready to be used as soon as it is taken out of the box, so that the operation of changing a cassette involves very little labor.

The upper and lower surface of the plastic box, as well as the two side walls and the rear surface, are provided with recesses 16 to accommodate connecting pieces. In the arrangement shown, the recesses take the form of two opposed truncated cones of moderate height on a common base. The connecting pieces 17 shown in FIG. 3 are used for connecting together plastic boxes of this type. The connecting piece 17 in FIG. 3 is made of an elastomer plastic material, so that its two halves can be fitted into two recesses 16 located opposite each other in a pair of adjacent plastic boxes. The connecting piece 17 is made in one piece selected for the recesses 16 from two connected bodies 18, each of which takes the form of two opposed truncated cones of moderate height sharing a common base. The lowermost of a stack of interconnected plastic boxes is preferably provided on its underside with feet. FIG. 4 shows a substantially hemispherical foot 19 which is connected to and is integral with a fitting body 18. Alternative versions are possible; for example, a foot of this kind can be provided with an insert of a harder or softer plastic. It is likewise possible for a foot of this type to be constructed or designed with a suction cup, so that, when it is connected with the bottom piece of a plastic box, it can be affixed to vertical walls, or else, when the foot is simply used as such, the entire system is secured against lateral displacement.

The recesses 16 are arranged so that the plastic boxes can be assembled not only one above the other or side-by-side, but also in a manner already known per se, connected with other boxes disposed 90° apart. In that way projecting corners are surrounded by walls, or plastic boxes provided within one plane can be connected to one or more rows of adjacent plastic boxes, or else the column-form arrangement already known per se can be adopted, with the possibility of extracting boxes in four different directions, in which case, for example, two plastic boxes placed side-by-side can be provided for each of the said directions. It may also prove desirable however, to provide more than two recesses on the flanks, rear and cover surfaces. The large number of recesses makes it possible, when they are appropriately spaced apart, to obtain a great number of possible combinations of ways of connecting boxes together. For example, individual cassettes can be removed from or replaced in a system of plastic boxes that are arranged one above the other in stacks and side-by-side horizontal rows in order to divde up the total areas formed. In the known column-shaped arrangements with access from all directions it is possible (by selecting the appropriate number of recesses and by positioning them in a suitable manner) to ensure that those flanks of a stack of plastic boxes forming the column-shaped arrangement which are exposed sideways will fit closely against those end surfaces of an adjacent stack which face towards the same side. On the other hand, the flanks can extend a short distance beyond the end surfaces, preferably corresponding to the thickness of a cover plate which covers the said end surfaces, so that they will be situated in the same plane as the outer surfaces of the cover plates. It is also advisable to provde a larger number of recesses 16 per surface if it is desired to increase the safety in the suspension by means of suction cups. For example, when "feet" having suction cups are used, a pile of boxes can be affixed not only to vertical surfaces, but also to horizontal or inclined surfaces, such as the underside of the dashboard of a motor vehicle. The feet fitted with suction cups are then inserted in the upper surface of the uppermost plastic box of a stack and pressed against the surface provided to accommodate them. Feet can also be constructed in such a manner that a lower "height zone" is created, corresponding to the height of the recesses 16, and having a cross-section slightly smaller than the clear entry cross section of the said recesses. This permits existing stacks of plastic boxes to be erected one above the other but also to be removed in stacks, if necessary, and used as a separate unit. It is also possible to use filling pieces similar in form to the the fitting bodies 18, so that exposed recesses 16 can be covered over by "blind plugs" formed by the fitting bodies, thus providing smooth surfaces on the boxes which can be easily given the required care.

A stack of cassette boxes arranged one above the other is shown schematically in FIG. 5. The plastic boxes 20 (of which the drawing shows six) are arranged one above the other and are joined by connecting pieces 17. A parallelepipedal structure 21 in the form of an end piece is provided above these plastic boxes, and also beneath them, the latter not being shown. Each such structure is provided with recesses 22 engaged by hinge pins 23 of a cover plate 24. Two pegs 25 pass through the structure to hold a rubber band 26 with a slight amount of prestress. The rubber band 26 is looped around a hook 27 provided on the inside of the cover plate 24. To make it easier to handle, the cover plate 24 has two grip cavities 28, one facing upwards and the other facing downwards. The cover plate 24 also has T-shaped detent pins 29 which are hammer-shaped and which, when the cover plate is pivoted downwards and pressed, enter undercut recesses 30 formed on the plastic boxes 20. By moving the cover plate 24 a slight distance upwards or downwards, the free ends of the detent pins 29 are caused to engage the undercut parts of the recesses 30 and to secure the cover plate in position. The rubber band 26 may alternatively be a helical or torque spring. It ensures that the cover plate 24 rests against the end surfaces of the elastic boxes 20 with a certain amount of pressure to close off the openings 2 in the boxes. The cover plate 24 can be raised or lowered by means of the grip cavities 28 in order to extract a cassette from a box in the stack. If the end surfaces of all the plastic boxes 20 are to be exposed at the same time (in order to enable compact cassettes to be rapidly selected or re-sorted), then the cover plate is pivoted upwards through an angle of 90° and its hinge pins 23 lifted out of the recesses 22 in which they are guided. The rubber band 26 draws the cover plate 24 into the recess 33 of the structure 21 as far as the detent pins 29 of the cover plate permit, so that the plate is located in the structure in an approximately horizontal condition. For the safe and reliable handling of the cover plate the provision of a prestressing spring or of detent pins is sufficient.

The stock of ten plastic boxes 20 has a further structure 21, which is not shown in the drawing, located beneath it with its cover plate extending upwardly, so that the cover plate 24 shown in FIG. 5 as well as that not shown face one another. The handling of the system is facilitated by the grip cavities 28 being directed in opposite directions. On the other hand, the second structure could be located between the fifth and the sixth boxes. Furthermore, another stack of boxes could be provided behind the plastic boxes 20 shown in the drawing and all the boxes could be closed by a special cover plate. It is also possible to provide, in addition to the stack illustrated, another stack with end surfaces facing away and this stack can be likewise provided with parallelepiped structures and with cover plates. Again, it is possible for more than two parallelepipedal structures 21 to be provided in a stock of plastic boxes. Stacks of any desired height can be terminated in a completely dust-tight manner by selecting the appropriate number of cover plates and constructing them to the necessary width in each case.

This new system allows various alternatives. As regard to the construction of the connecting pieces, "feet" and "blind plugs", of which the number and pitch may vary, this has already been explained. The use of cover plates does not depend on separate parallelepipedal structures (particularly in a lateral connection) or on maintaining a certain distance, which object can be achieved by selecting an appropriate construction for the connecting pieces. Cover plates can be provided with pivot pins mounted on levers and caused to engage recesses provided in the plastic cassette box from the side, unless hinge pins or borings accommodating them are already provided in recesses of the plastic boxes themselves. As shown in FIG. 5, the cover plate 24 is preferably provided on its inner side with ribs, recesses, or compartments 31 into which labels or marking strips can be pushed, laid or stuck. It has also proved to be advantageous to mark the narrow rear strips of the cassettes with the necessary text and to use transparent cover plates, so that this text can be seen even when the cover plate is closed. A clearer view of the apparatus is provided and the text rendered more legible if the parts of the cover plate situated opposite to the rear side of inserted cassettes are provided with horizontal cylindrical lenses, so that the text appears enlarged when viewed.

The version of the plastic box shown in FIGS. 6 to 8 in which the height is reduced to double the thickness of the cover surfaces in the central zone 3 has proved advantageous. This leaves a box 101 formed as a U-bracket with a U-shaped profile wherein the lateral branches 104 correspond to the edge zones 4 of FIG. 1 and surround the thinner edge strips of the inserted compact cassette 109. The legs of the U are connected to a root zone or bight to which the pressure spring 112 is attached. The remaining cover surfaces are thus limited to the edge zones 104, and also to a further narrow zone which covers the root of the pressure spring 112. The later branches are provided on the outside with the recesses 116, so that plastic boxes of this kind can be connected together to form comparatively low stacks. For use as an individual box and also for the purpose of sale, the cassette is protected by a special cover 120 with a U-profile, which is made of a thin plastic material and of which the legs 121 and 122 protect the cover surfaces of the plastic box, while its bight 123 is situated in front of the end face of the said plastic box 101. In the simplest case the said protective cover 120 can be made easily attachable by constructing it in such a way that its legs slightly converge and also by adapting them to the dimensions of the plastic box. It can be secured by connecting elements, such as dimples 124 and pegs 125 which engage one another in accordance with the form-locking principle. If the plastic box 101 is constructed so that those edge zones of the cover surfaces which are close to the pressure spring are provided with concavities having oblique flanks and if the inner edge strips of the cover surfaces of the protective covering have lugs which engage the said concavities, a detent system is provided which can be easily released. If the mutually-opposite connecting devices are constructed on one side as concavities and lugs, while on the other side (as shown in the right hand half of FIGS. 1 and 2, for instance), they take the form of cylindrical bores and cylindrical pins engaging them, this system provides a pivotable box which can be easily opened by pivoting the protective covering donwards and which engage and is held in place after being closed. An identical or similar protective covering, a cap or a covering strip can also be used in order to seal the cassette boxes shown in FIGS. 1 and 2 on all sides for sale purposes. The sealing strip can in this case be constructed in such a way as to indicate whether the cassette has already been used before being sold. When the cassette box with open covering surfaces and of limited height is assembled in accordance with the version just described, this leaves a continuous internal space within which the individual compact cassettes are held in a defined position between the edge zone 4, which extend inwards in the manner of ribs. The said internal space is covered at the top and at the bottom by parallelepipedal structure 21, which may be made lower than shown in FIG. 5, in order to save space. Stacks of limited height can be sealed on one side by a simple plate provided with recesses 16 or by a parallelepipedal structure 21 having no cover plate. FIGS. 9 and 10 show variations in the form of the feet 126 and 127, respectively, that can be used in supporting a stack of containers.

The cover plates need not be designed to slide in, or their travel can be limited by the use of special lugs, stops, or similar devices. The compact cassettes can be guided in the plastic box solely by the guide groove 7 on the leaf springs 6. On the other hand, the guiding action can also be provided by the edge zones 4, as well as by any central zone 3 which may be provided, a specially reinforced edge zone being unnecessary if, for example, the portion demarcating the edge zone from the central zone contains a pair of ribs between which the clear width corresponds to the thickness of the edge zones of a compact cassette, and which surrounds an edge zone of this kind in the manner of a fork.

When plastic boxes are assembled in the form of a vertical column, it may be considered desirable (as a means of facilitating their handling), to provide a substructure consisting of a turntable, a base plate fitted with a handle extending vertically upwards, a turntable fitted with such a handle, or a similar device. The mounting surfaces of the base plate, turntable, or similar device are preferably provided with recesses 16 arranged in such a manner that in each case such recesses 16 or certain selected recesses 16, inside the base surface of a column-shaped arrangement of plastic boxes, are also situated opposite recesses 16 of the mounting surface. By means of connecting pieces 17, the column-shaped assembly of plastic boxes can be rigidly connected to the mounting surface; if, however, use is made of feet 19 or of a kind which can loosely engage recesses 16 by means of an approximately prismatical cylindrical portion, then the column-shaped assembly (although it can be firmly erected on the base surface and caused, if necessary, to rotate together with the turntable) can also be removed therefrom as a complete assembly, where necessary.

At further embodiments of the invention recesses 16 may omitted. Connecting the boxes to piles may be done by sticking by means of a sticker for plastics. For facilitate adjusting the boxes at sticking them together, surfaces or halves of surfaces of said boxes may be provided with small protruding pins for adjusting, while adjacent surfaces or halves of surfaces comprise small bores for accepting (embracing) said pins. In connection with arch-shaped guide grooves, the cross-sections of which are adapted to that of the pins and being provided in plates, structures 21, covering plates, surfaces of boxes, or the like it is possible to turn (pivot) the above described columns of boxes without providing shafts, links or the like. The pins are guided in the grooves forming a closed circuit. Connecting U-shaped boxes or boxes of rectangular form also may be done by inserting the boxes in a common housing in which they will be fixed by sticking or by means of notches jumping in grooves.

In each of these cases the object is to provide a plastic box which serves as a sales package for a compact cassette and which can also be assembled with the use of a moderator number of additional parts to form any desired type of assembly for storage. An advantage of this type of cassette reserve is that it is completely closed, so that the compact cassettes themselves are protected from dust and other foreign matter, in addition to which the entire apparatus in which they are accommodated will only have smooth outer surfaces which are easy to clean. The cassette box can be adapted to any form of cassette storage, whether of small or very simple capacity.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A container of plastic material suitable for receiving a compact cassette of recording tape, comprising a shallow box of rectangular form having an opening in one of its longer sides through which the cassette can be introduced into the box, each of the two shorter sides of the box having a leaf spring associated with the internal wall thereof, the springs being resiliently secured to the wall adjacent the open side of the box and each spring having a pair of detent surfaces thereon in spaced apart relation, such that, when a cassette is inserted completely into the box, the detent surfaces of each spring engage opposite ends of a guide bar on the adjacent side edge of the cassette to retain the cassette in the box, and a pressure spring is provided on the internal surface of the longer side of the box which faces said opening to be engaged by the cassette.

2. A container as recited in claim 1, wherein each leaf spring is provided with a guide groove extending along its length for receiving the guide bars of the compact cassette.

3. A container as recited in claim 1, wherein the detent surfaces extend beyond the surfaces of the leaf springs.

4. A container as recited in claim 1, wherein the pressure spring engages the ends of the leaf springs when the cassette is fully inserted in the box.

5. A container as recited in claim 1, wherein the pressure spring is in the form of a symmetrical leaf spring affixed to the middle of the side wall of the box.

6. A container as recited in claim 5, wherein the distance between the ends of the pressure spring, when the cassette is inserted and fixed in the box, slightly exceeds the width of the cassette, and the free ends of the spring are provided with bearing surfaces for receiving the supporting surfaces at the ends of the leaf springs.

7. A container as recited in claim 6, wherein the bearing surfaces extend into openings on the supporting surfaces of the leaf springs and are held thereby.

8. A container as recited in claim 1, wherein the outer surfaces of the box are provided with undercut recesses and with projections corresponding thereto, serving for mutual engagement and connection of two or more boxes on the form-locking principle.

9. A container as recited in claim 1, wherein undercut recesses are provided in outer surfaces of the box.

10. A container as recited in claim 9, wherein connecting pieces are provided consisting of elastic plastic material and of a shape which corresponds to that of two recesses placed one upon the other for connecting two boxes together.

11. A container as recited in claim 9, wherein feet are provided formed of an elastic plastic material having an upper portion and a lower portion, the upper portion being constructed as a fitting body corresponding to the shape of the recesses.

12. A container as recited in claim 11, characterized by the fact that the lower portion, at least over a lower zone whose height corresponds to the depth of the recesses 16 is smaller in cross-section than the clear cross-section of the recesses 16.

13. A container as recited in claim 12, characterized by the fact that the height lower portion has a lower zone whose height is less than the depth of the recesses 16, while above the said zone the said lower portion suddenly increases in cross section, forming supporting flanks.

14. A container as recited in claim 1, characterized by the fact that its thickness is only slightly less than that of the conventional cassette, so that its large covering surfaces are limited to the flanks of a U-bracket having a U-profile, while the U-bracket is surrounded by a protective covering having a U-profile, which rests on the covering surfaces and the end face.

15. A container as recited in claim 14, characterized by the fact that the U-bracket and the protective covering are detachably interconnected by depressions provided on the internal sides of the covering surfaces of the protective covering, in the zone of its free edges, and also in the opposite zones of the U-bracket, and by projections engaging the said depressions.

16. A container as recited in claim 15, characterized by the fact that at least one pair of the connecting devices take the form of concavities and of lugs engaging them in the manner of a catch.

17. A container as recited in claim 15, characterized by the fact that at least one pair of the connecting devices take the form of a cylindrical hole or blind hole and of a pin engaging it.

18. A container as recited in claim 1, characterized by the provision of a covering plate of limited thickness and made of transparent plastic material, its length corresponding to that of the box while its width is several times that of the box, the said plate being provided on one longitudinal side with hinge elements and, in the vicinity of the opposite longitudinal side, with grip cavities.

19. A container as recited in claim 18, characterized by the fact that the hinge elements are provided with levers which extend backwards from the plane of the covering plate 24 and which surround in the box a fork-like manner of and which hingedly engages the said container by means of a pin-and-bore connection.

20. A container as recited in claim 19, characterized by the fact that the longitudinal side of the covering plate which is situated opposite to the hinge element is provided with locking pins, while the container is provided with recesses which enlarge inwardly by and which serve to accommodate the said locking pins.

21. A container as recited in claim 20, characterized by the fact that the hinge elements engage recesses of a comparatively low parallelepipedal structure of which the base surface corresponds to that of the container and which is provided with recesses.

22. A container as recited in claim 21, characterized by the fact that the parallelepiped is provided with a recess for an endless rubber band which is stretched between elements provided on the base of the recess and a hook provided on the rear side of the covering plate.

23. A container as recited in claim 18, characterized by the fact that the covering plate is provided with recesses to accommodate an identification plate.

* * * * *